(12) United States Patent
Hirth (10) Patent No.: US 6,933,638 B2
(45) Date of Patent: Aug. 23, 2005

(54) ELECTRIC MOTOR HAVING A REVERSE AIR FLOW COOLING SYSTEM

(75) Inventor: Ron D. Hirth, Troy, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/818,919

(22) Filed: Apr. 6, 2004

(65) Prior Publication Data

US 2005/0093382 A1 May 5, 2005

Related U.S. Application Data

(60) Provisional application No. 60/516,496, filed on Oct. 30, 2003.

(51) Int. Cl.[7] .......................... H02K 9/06; H02K 17/08
(52) U.S. Cl. ........................ 310/71; 310/62; 310/89
(58) Field of Search ..................... 310/62, 68 R, 310/89, 71

(56) References Cited

U.S. PATENT DOCUMENTS

| | | | | |
|---|---|---|---|---|
| 2,094,386 A | * | 9/1937 | Veinott | 361/26 |
| 2,157,191 A | * | 5/1939 | Sinnett | 310/62 |
| 2,652,506 A | * | 9/1953 | Furnas et al. | 310/71 |
| 3,530,348 A | | 9/1970 | Conner | |
| 3,792,324 A | | 2/1974 | Suarez et al. | |
| 3,940,646 A | * | 2/1976 | Buckman | 310/166 |
| 4,292,555 A | | 9/1981 | Schaefer | |
| 4,325,012 A | | 4/1982 | Schaefer | |
| 4,658,195 A | | 4/1987 | Min | |
| 4,761,601 A | | 8/1988 | Zaderej | |
| 4,781,726 A | * | 11/1988 | Fisher et al. | 29/596 |
| 4,804,901 A | | 2/1989 | Pertessis et al. | |
| 4,839,547 A | * | 6/1989 | Lordo et al. | 310/60 A |
| 4,843,295 A | | 6/1989 | Thompson et al. | |
| 4,862,053 A | | 8/1989 | Jordan et al. | |
| 4,880,391 A | * | 11/1989 | Hurtgen | 439/221 |
| 4,953,285 A | * | 9/1990 | Fisher | 29/596 |
| 5,017,853 A | | 5/1991 | Chmiel | |
| 5,079,464 A | * | 1/1992 | King et al. | 310/89 |
| 5,192,888 A | * | 3/1993 | Fleer | 310/71 |
| 5,296,795 A | | 3/1994 | Dropps et al. | |
| 5,311,090 A | | 5/1994 | Ferlatte | |
| 5,412,272 A | * | 5/1995 | Mensching | 310/88 |
| 5,528,120 A | | 6/1996 | Brodetsky | |
| 5,563,461 A | | 10/1996 | Daniels | |
| 5,648,694 A | | 7/1997 | Kobayashi et al. | |
| 5,763,969 A | | 6/1998 | Metheny et al. | |
| 5,780,946 A | * | 7/1998 | Nakamura et al. | 310/58 |
| 5,796,234 A | * | 8/1998 | Vrionis | 318/751 |
| 5,872,410 A | * | 2/1999 | Sudoff | 310/68 R |
| 5,905,318 A | | 5/1999 | Faulhaber et al. | |
| 6,232,742 B1 | | 5/2001 | Wacknov et al. | |
| 6,271,608 B1 | * | 8/2001 | Haydock et al. | 310/71 |
| 6,464,471 B1 | * | 10/2002 | Mathis et al. | 417/350 |
| 6,664,682 B2 | * | 12/2003 | Williams et al. | 310/89 |
| 6,828,704 B2 | * | 12/2004 | Okamoto et al. | 310/71 |

FOREIGN PATENT DOCUMENTS

| | | | | |
|---|---|---|---|---|
| JP | 08-154367 | * | 6/1996 | H02K/17/30 |
| JP | 09-215284 A | * | 8/1997 | H02K/17/08 |
| JP | 2001275301 A | * | 10/2001 | H02K/5/22 |

OTHER PUBLICATIONS

William L. Mehlhorn, U.S. Appl. No. 10/615,815, filed Jul. 9, 2003.

* cited by examiner

Primary Examiner—Burton Mullins
(74) Attorney, Agent, or Firm—Michael Best & Friedrich LLP (57) ABSTRACT

An electric motor having a reverse air flow cooling system that eliminates the need to extend lead wires past the fan. The electric motor includes a fan positioned on the lead-end of the motor to move air through a housing of the electric motor in a direction generally defined from the shaft-end of the motor to the lead-end of the motor. Lead wires can extend from the stator windings radially through the housing for connection to an electric start switch. The electric start switch can be positioned in a control box that is coupled to the housing. The electric start switch can be operable to remove an auxiliary circuit from a stator circuit after startup of the electric motor.

20 Claims, 5 Drawing Sheets

FIG. 5

ELECTRIC MOTOR HAVING A REVERSE AIR FLOW COOLING SYSTEM

CROSS REFERENCE TO RELATED APPLICATION

This application claims the benefit of U.S. Provisional Application No. 60/516,496, filed Oct. 30, 2003, the entire content of which is incorporated herein by reference.

BACKGROUND OF THE INVENTION

The invention relates to electric motors, and more particularly to electric motors having a reverse air flow cooling system.

Electric motors often include a fan within the motor housing to direct air through the housing to cool the motor components. In the past, the fan has generally been mounted at the shaft-end of the motor to push air through the housing towards the lead-end of the motor. Greater cooling can be obtained if the fan is mounted at the lead-end of the motor so that the fan pulls, rather than pushes, air through the motor. However, with the fan at the lead-end of the motor, motor leads may interfere with, or become entangled in, the fan as the leads extend from the stator to the control compartment positioned at the lead-end of the motor.

U.S. Pat. No. 5,563,461 provides one solution to the lead wire problem by routing the lead wires through a baffle or lead guide mounted adjacent the fan.

SUMMARY OF THE INVENTION

The invention provides an electric motor having a reverse air flow cooling system that eliminates the need to extend the lead wires past the fan.

In one construction, the invention provides an electric motor that can comprise a housing, a stator, a shaft, a rotor, a fan, a control box, and lead wires. The housing can include a first end, a second end, a first aperture defined in the first end of the housing, and a second aperture defined in the housing between the first and second ends of the housing. The stator is fixed relative to the housing and includes a stator circuit having a main circuit and an auxiliary circuit. The shaft is rotatable relative to the housing and extends through the first aperture for connection to a load. The rotor and the fan are connected to the shaft for rotation with the shaft relative to the stator, the fan being connected between the second end and the rotor and configured to pull air in a direction generally defined from the first end to the fan. The control box can be coupled to the housing adjacent the second aperture and configured to house a plurality of control components utilized in the control and operation of the electric motor. The plurality of control components can include an electric start switch that is operable to remove the auxiliary circuit from the stator circuit after startup of the electric motor. The lead wires electrically connect the stator circuit and at least some of the plurality of control components. The lead wires extend through the second aperture, which is positioned axially between the fan and the first end of the housing, and into the control box.

In another construction, the invention provides an electric motor that can comprise a housing, a stator, a shaft, a rotor, a fan, a control box, and lead wires. The housing can include a first end frame, a second end frame, a body connecting the first end frame and the second end frame, a shaft aperture defined in the first end frame, a lead wire aperture defined in the body, and a plurality of air vents defined in the body. The stator is fixed relative to the housing and includes a stator circuit having a main circuit and an auxiliary circuit. The main circuit includes a main winding, and the auxiliary circuit includes an auxiliary winding and a capacitor. The shaft is rotatable relative to the housing and extends through the shaft aperture for connection to a load. The shaft can be supported for rotation about a shaft axis by a first bearing supported by the first end frame and a second bearing supported by the second end frame. The rotor and the fan are connected to the shaft for rotation with the shaft relative to the stator, the fan being connected between the second end frame and the rotor and configured to pull air in a direction generally defined from the first end frame to the fan. At least a portion of the air flow generated by the fan can exit the housing through the plurality of air vents. The control box can be coupled to the housing adjacent the first lead wire aperture. The control box includes a second lead wire aperture defined in the control box. The control box can be configured to house a plurality of control components utilized in the control and operation of the electric motor. The plurality of control components can include an electric start switch that is operable to remove the auxiliary circuit from the stator circuit after startup of the electric motor. The lead wires electrically connecting the stator circuit and at least some of the plurality of control components. The lead wires extend through the first and second lead wire apertures, which are at least partially positioned axially between the fan and the first end frame.

In yet another construction, the invention provides an electric motor that can comprise a housing, a stator, a shaft, a rotor, a fan, a control box, and lead wires. The housing can include a first end frame, a second end frame, a generally cylindrical body connecting the first end frame and the second end frame, a shaft aperture defined in the first end frame, a lead wire aperture defined in the generally cylindrical body, and a plurality of air vents defined in the generally cylindrical body. The stator is fixed relative to the housing and can include a stator circuit having a main circuit and an auxiliary circuit. The main circuit includes a main winding, and the auxiliary circuit includes a start winding and a capacitor. The shaft is rotatable relative to the housing and extends through the shaft aperture for connection to a fluid pump of a jetted tub application. The shaft can be supported for rotation about a shaft axis by a first bearing supported by the first end frame and a second bearing supported by the second end frame. The rotor and the fan connected to the shaft for rotation with the shaft relative to the stator. The fan can be connected to the shaft between the second end frame and the rotor and configured to pull air in a direction generally defined from the first end frame to the fan. At least a portion of the air flow generated by the fan can exit the housing through the plurality of air vents. The control box can be coupled to the housing adjacent the first lead wire aperture and includes a second lead wire aperture defined in the control box. The control box can be configured to house a plurality of control components utilized in the control and operation of the electric motor. The plurality of control components can include the capacitor and an electric start switch. The electric start switch is operable to remove the auxiliary circuit from the stator circuit after startup of the electric motor. The lead wires electrically connect the stator circuit and the electric start switch. The lead wires extend through the first and second lead wire apertures, where are at least partially positioned axially between the fan and the first end frame. The lead wires do not extend axially past the fan in the direction of the second end frame.

Further aspects of the invention together with the organization and manner of operation thereof will become apparent from the following detailed description of the invention when taken in conjunction with the accompanying drawings wherein like elements have like numerals throughout the drawings.

BRIEF DESCRIPTION OF THE DRAWINGS

The invention is further described with reference to the accompanying drawings which show embodiments of the invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the invention. Also, it should be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The use of "jetted tubs" and variations thereof herein is meant to encompass drainable fluid-holding apparatus that include recirculating pumps for pumping fluid through fluid jets in the fluid-holding apparatus. Examples of jetted tubs include hydromassage bathtubs, whirlpools, and spas. The use of "fan" and variations thereof herein is meant to encompass air-moving devices such as blowers, fans, and the like.

DESCRIPTION OF THE INVENTION

Figure 1:
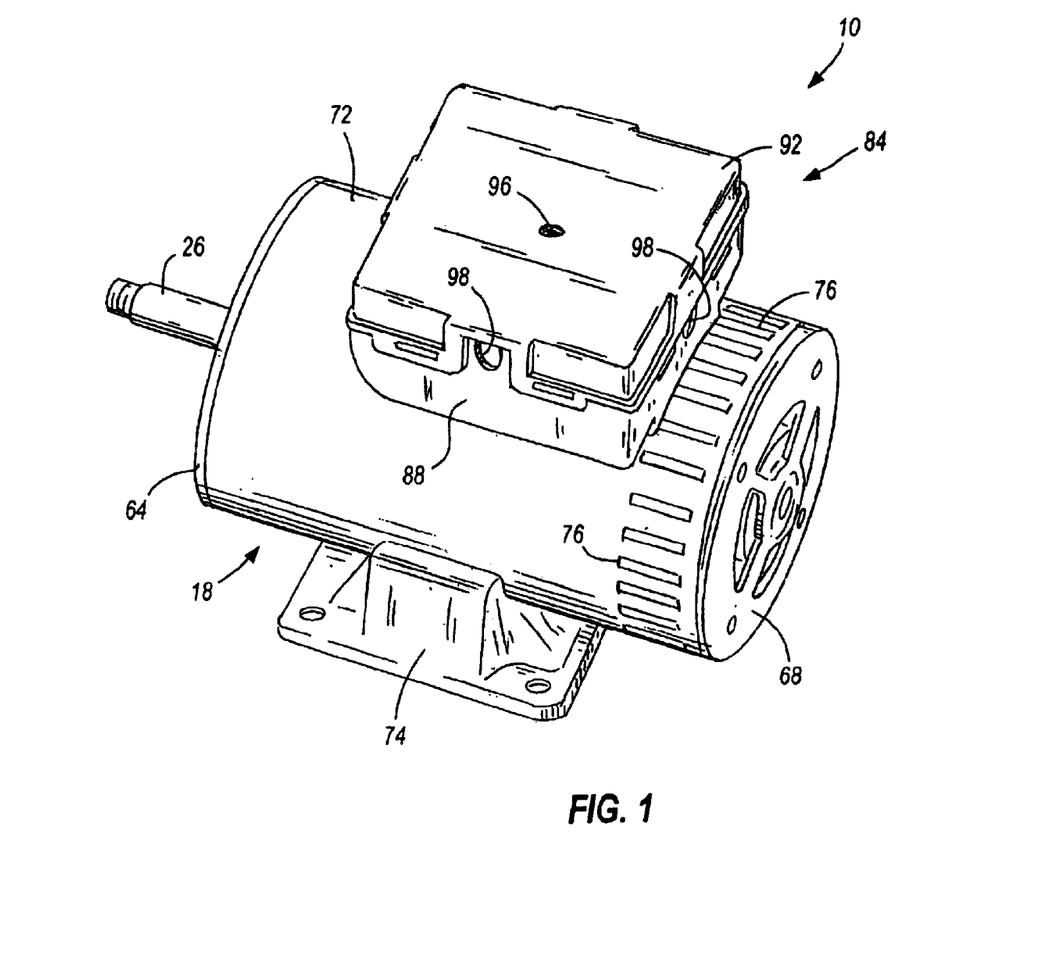
FIG. 1 illustrates an electric motor that incorporates aspects of the invention.
Figure 2:
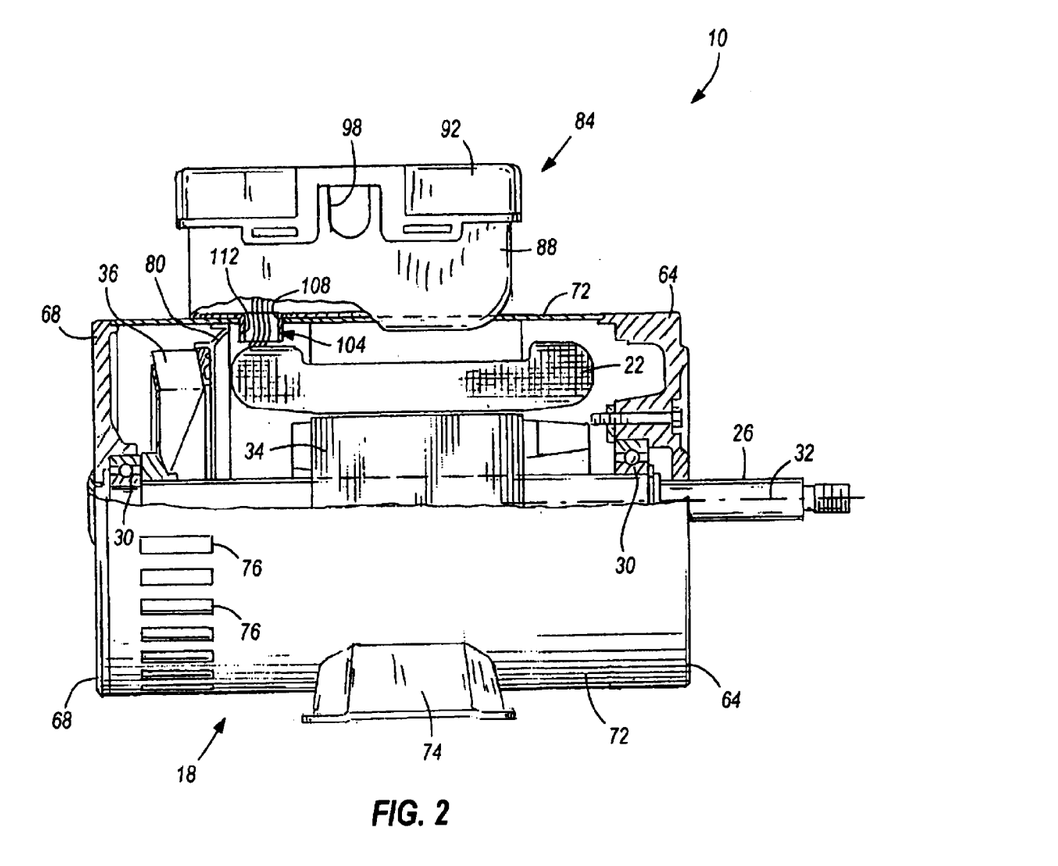
FIG. 2 is a partially sectioned view of the electric motor of FIG. 1.
Figure 3:
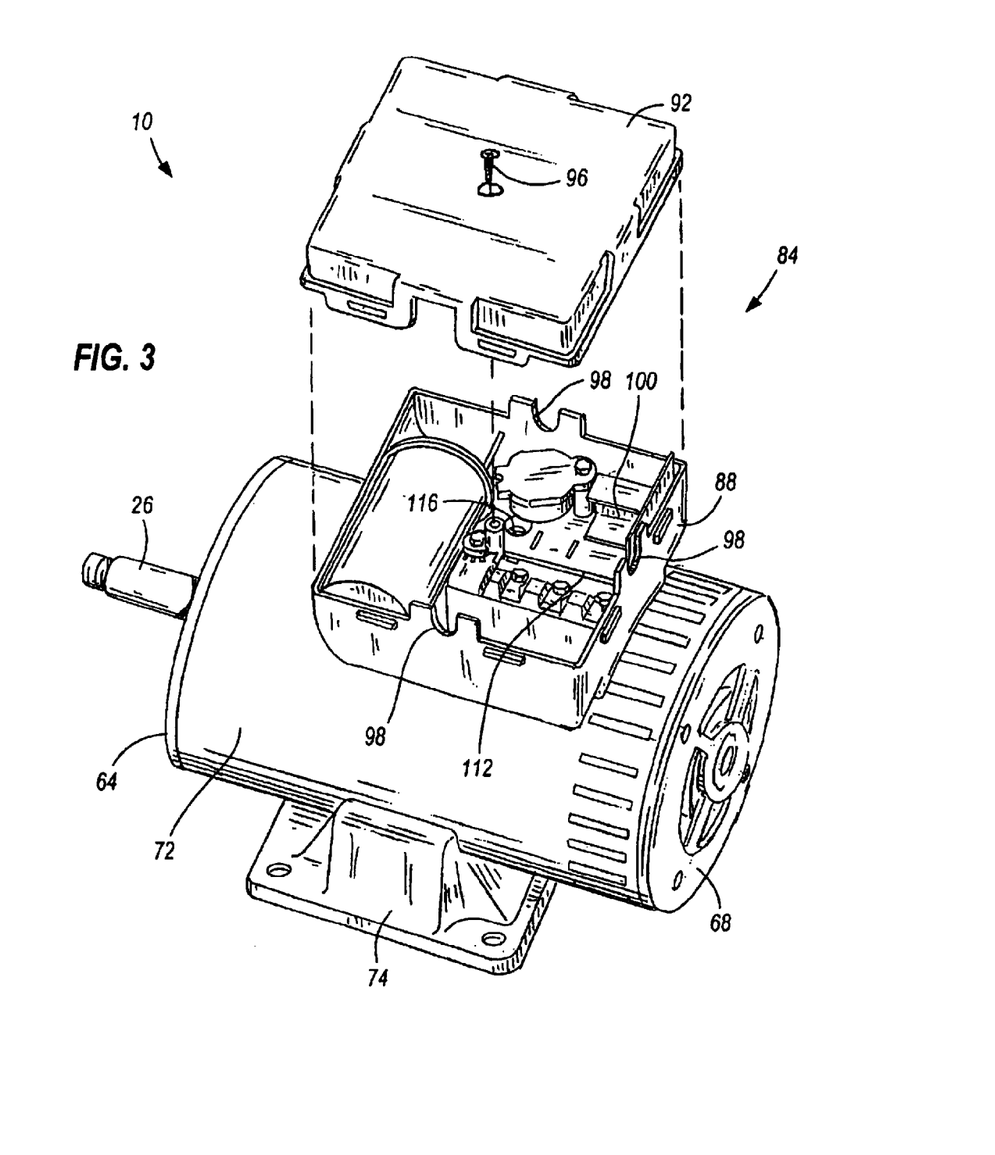
FIG. 3 is partially exploded view of the electric motor of FIG. 1.

An electric motor 10 incorporating aspects of the invention is illustrated in FIGS. 1–3. The illustrated motor 10 is an induction motor (e.g., a permanent-split-capacitor induction motor, a capacitor-start induction motor, a capacitor-start capacitor-run induction motor, a split-phase induction motor, and the like) designed for use in driving pumps for jetted tubs. It should be understood that the electric motor 10 is also capable of use in other applications.

Induction motors that are powered by a single-phase power source often utilize auxiliary circuits to enhance motor operation (e.g., starting operation of the motor). Often, the auxiliary circuit is removed once the motor is started. Various mechanisms have been implemented to switch-out or remove auxiliary circuits. For example, a centrifugal switch can be mounted on the shaft of the motor to sense the rotational speed of the shaft and open the auxiliary circuit contacts at an appropriate rotational speed (e.g., approximately 75% to 80% of the rated running speed of the motor). However, numerous problems results from the use of a centrifugal switch as a switch-out mechanism (e.g., sparking occurs when the contacts of the centrifugal switch are opened, thus leading to failure of the centrifugal switch; necessary adjustment of the switch-out speed of the centrifugal switch during the assembly process, thus adding time and cost to the assembly process; placement of the centrifugal switch on the shaft, thus adding axial length to the motor; noise caused when the centrifugal switch opens and closes, thus causing user annoyance; and the like). Additionally, when the motor includes a reverse air flow cooling system, lead wires must generally extend from the stator windings and past the fan to the components utilized in the control and operation of the motor (e.g., the centrifugal switch). The components utilized in the control and operation of the motor are often placed in a control compartment on the lead-end of the motor. Extending the lead wires past the fan may interfere with operation of the fan and/or add time and expense to the motor assembly process. Accordingly, the invention provides a motor having a reverse air flow cooling system that eliminates the need to extend lead wires past the fan.

With reference to FIG. 2, the motor 10 includes a housing 18, a stator 22 fixed relative to the housing 18, a shaft 26 rotatable relative to the housing 18 about a shaft axis 32, bearings 30, a rotor 34 connected to the shaft 26 for rotation therewith relative to the stator 22, and a fan 36 connected to the shaft 26 for rotation therewith relative to the housing 18. The fan 36 moves air through the housing 18 from the shaft-end toward the fan 36 to provide a reverse air flow cooling system.

Figure 4:
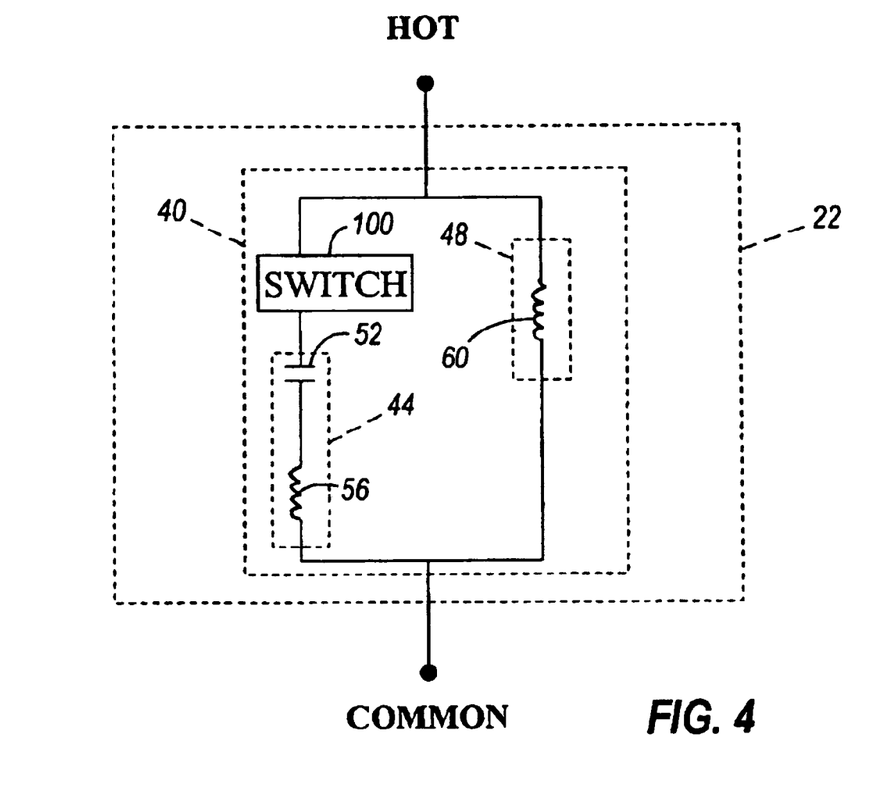
FIG. 4 schematically illustrates a stator of the electric motor of FIG. 1.

The stator 22 includes one or more windings (e.g., main windings, start windings, phase windings, and the like). With reference to FIG. 4, the illustrated stator 22 includes a stator circuit 40 of a capacitor-start design. The stator circuit 40 includes an auxiliary circuit 44 and a main circuit 48. An electronic start switch 100 that is associated with the stator circuit 40 is discussed further below. The auxiliary circuit 44 includes a start capacitor 52 and a start winding 56. The main circuit 48 includes a main winding 60. Although the invention is described with respect to a single-speed induction motor having a stator circuit of a capacitor-start design, it is understood that other constructions of the invention can comprise other types of electric machines having a rotor and a stator (e.g., other single-speed induction motors; multi-speed induction motors having two or more stator circuits, each of which may provide single speed operation and/or variable speed operation; other types of electric motors; and the like).

Figure 5:
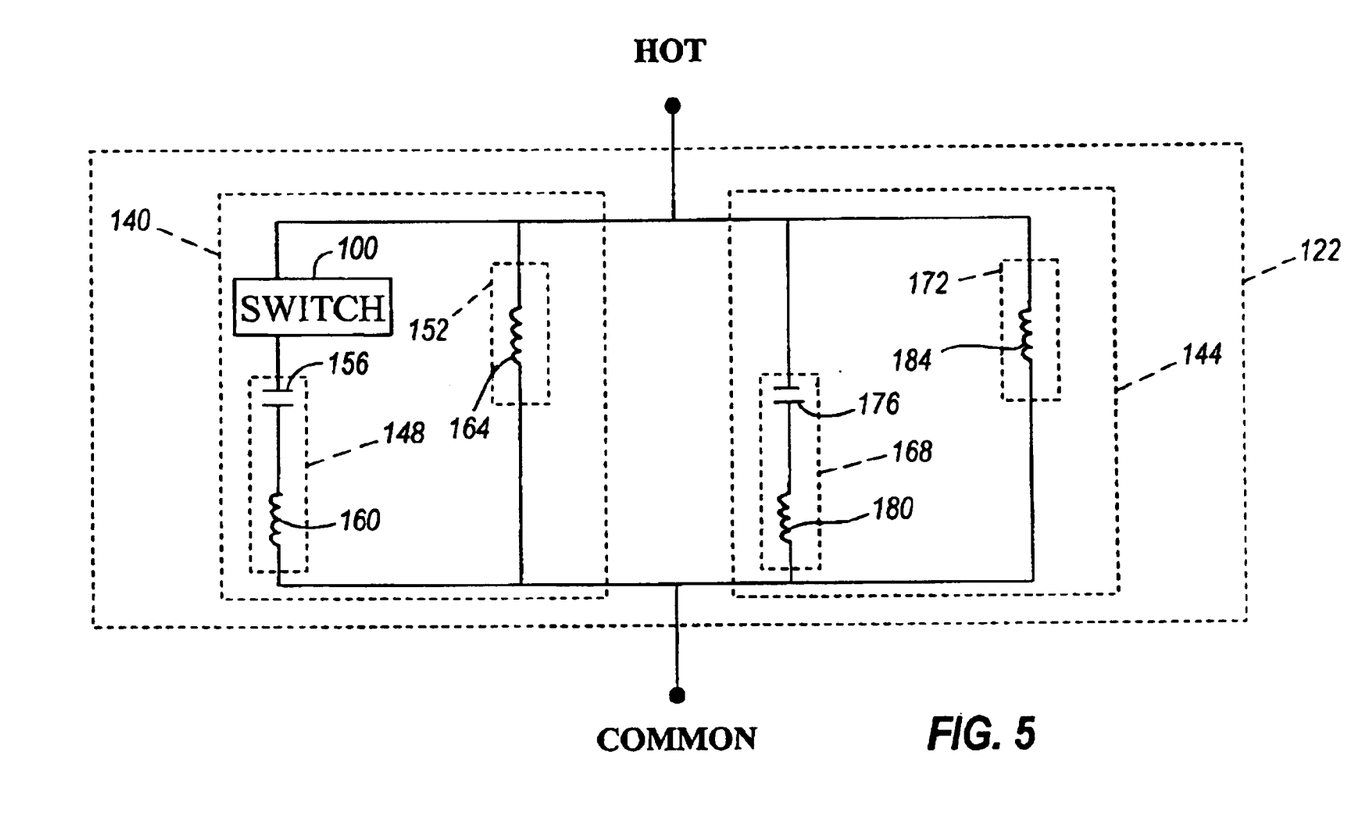
FIG. 5 schematically illustrates an alternative construction of the stator of FIG. 4.

In one exemplary alternative construction, the stator 122, as illustrated in FIG. 5, includes a first stator circuit 140 of a capacitor-start design, and a second stator circuit 144 of a permanent-split-capacitor design. Motor manufacturers typically do not produce two-speed motors that include two stator circuits of a permanent-split-capacitor design because a tank or parallel resonant circuit can result, causing unfavorable operating characteristics of the motor (e.g., reduced efficiency, increased noise, and the like). Accordingly, motor manufacturers typically produce two-speed motors that include a first speed circuit of a permanent-split-capacitor design and a second speed circuit of another design (e.g., a capacitor-start design, a split-phase design, and the like). Similar to the stator circuit 40, the first stator circuit 140 includes an auxiliary circuit 148, a main circuit 152, and an electronic start switch 100 associated therewith. The auxiliary circuit 148 includes a start capacitor 156 and a start winding 160. The main circuit 152 includes a main winding 164. The second stator circuit 144 includes an auxiliary circuit 168 and a main circuit 172. The second stator circuit 144 does not include an associated switch-out mechanism because auxiliary circuits of a permanent-split-capacitor designed stator circuit generally remain connected during normal operation of the motor (i.e., the main circuit and the auxiliary circuit form a permanently connected or closed loop such that a switch-out mechanism is not required). The auxiliary circuit 168 includes a start/run capacitor 176 and a phase winding 180. The main circuit 172 includes a main winding 184.

With reference to FIGS. 1–3, the housing 18 includes a first end frame 64 positioned on a first end of the housing 18, a second end frame 68 positioned on a second end of the housing 18, a generally cylindrical sheet metal body 72 that connects the first and second end frames 64 and 68, and a base 74. In the illustrated construction, the body 72 includes air vents 76 positioned substantially adjacent the fan 36. In some constructions, the air vents 76 may be located directly beyond the blades of the fan 36 to increase the efficiency of the operation of the fan 36. Reduced temperature of operation resulting from increased cooling operation presents opportunity to reduce active material in the motor 10, thus reducing cost. A baffle 80 may be utilized to prevent water entering the air vents 76 from contacting the motor windings.

The motor 10 also includes a junction or control box 84. The control box 84 is connected to the body 72 of the housing 18. In some constructions, the housing 18 includes the control box 84. The control box 84 houses components utilized in the control and operation of the motor 10 (e.g., a terminal board, a start capacitor, a run capacitor, a thermal protector, an electronic start switch, and the like). For the construction shown, the control box 84 includes a base portion 88 and a cover 92. The cover 92 is secured to the base portion 88 using a single screw 96, providing ease of assembly and ready access for maintenance. When assembled, the control box 84 provides a weather tight seal that protects the control components from environmental factors. The illustrated base portion 88 and cover 92 are formed of plastic. In other constructions, the control box 84 may be alternatively shaped and/or formed.

As shown in FIGS. 1–3, the control box 84 also includes a number of power cord inlet options 98. These inlet options 98 allow for the use of a single control box 84 in numerous applications having different configurations. That is, a power cord can enter the control box 84 through any of the inlet options 98 depending on the orientation of the motor 10. Generally, the unused power cord inlets 98 are enclosed to protect the control components from environmental factors.

With reference to FIGS. 3 and 4, the motor 10 utilizes an electronic start switch 100. The electronic start switch 100 replaces the mechanical switch and governor (e.g., centrifugal switch) typically utilized for motor starting operations. In some constructions, the electronic start switch can include solid state electronics that remove the auxiliary circuit from the stator circuit after startup of the motor 10. In other constructions, the electronic start switch can comprise or be replaced by an electric start switch (e.g., an electric start switch that includes a non-solid state design such as at least one electromechanical relay). The illustrated electronic start switch 100 works on the decreasing characteristic of the auxiliary winding current as the speed of the motor 10 increases from standstill. The solid state electronics "sense" a ratio of lock rotor phase current t6 a calibrated initial drop in phase current during startup. In one construction, the electronic start switch 100 removes the auxiliary circuit from the stator circuit at a set ratio of the current drop and at approximately 70–80% of rated speed. The electronic start switch 100 may also include a built-in timeout feature that will automatically shut the auxiliary circuit off after a predetermined time (e.g., approximately 1.2 seconds). The electronic start switch 100 may be utilized in single-speed or multi-speed motors. One construction of the electronic start switch is described in commonly assigned U.S. patent application Ser. No. 10/615,815 entitled "Switch Assembly, Electric Machine having the Switch Assembly, and Method of Controlling the Same," the entire content of which is incorporated herein by reference.

Elimination of the electromechanical starting components eliminates the need to place control components in a control compartment positioned at the lead-end of the motor, thereby eliminating the need to extend lead wires past the fan 36. Accordingly, the lead wires can extend out of the housing 18 anywhere forward of the fan 36 for connection to control components located in the control box 84. Since lead wires exit ahead of fan 36, no accommodations are necessary for their physical protection adjacent the fan 36. In the illustrated construction, lead wires 104 extend radially through an aperture 108 in the body 72 of the housing 18 (see FIG. 2), through an aperture 112 in the control box 84, and into the control box 84 for connection to the control components. The aperture 108 may be placed anywhere on the body 72 of the housing 18 to best suit placement of the control box 84 relative to the housing 18. As shown in FIGS. 2 and 3, the lower portion of the base portion 88 is shaped to match the outer circumference of the body 72. With reference to FIG. 2, a screw 116 extends through the base portion 88 for connection to the body 72.

Use of the control box 84 provides ready access to the control components for maintenance. Additionally, installation of the control components in the control box 84 can be performed off-line, thus easing assembly. Use of the control box 84 also provides enhanced flexibility in motor configuration and results in an axially shorter motor when compared with similar types of motors that include traditional electromechanical starting components positioned in a control compartment on the lead-end of the motor. Reduced axial size of the motor is particularly desirable in the jetted tub industry which often requires positioning of motors in a small space.

The motor 10 provides an increased ambient temperature operating specification. Often, electric motors used in applications such as jetted tubs have a 40 degree Celsius ambient operating temperature. When the ambient temperature is above this value, the thermal protector trips and ceases operation of the motor to prevent damage and/or electrical shock hazards. The increased ambient temperature operating specification of the motor 10 decreases the likelihood of undesirable shutdown, even when the motor 10 is placed in a confined compartment under a jetted tub. In one construction, the ambient temperature operating specification is 70 degrees Celsius.

What is claimed is:

1. An electric motor comprising:
  a housing comprising a first end, a second end, a first aperture defined in the first end of the housing, and a second aperture defined in the housing between the first and second ends of the housing;
  a stator fixed relative to the housing, the stator comprising a stator circuit comprising a main circuit and an auxiliary circuit;
  a shaft rotatable relative to the housing and extending through the first aperture for connection to a load;
  a rotor connected to the shaft for rotation with the shaft relative to the stator;

a fan connected to the shaft for rotation with the shaft, the fan being connected to the shaft between the second end and the rotor, the fan being configured to pull air in a direction generally defined from the first end to the fan;

a control box coupled to the housing adjacent the second aperture and configured to house a plurality of control components utilized in the control and operation of the electric motor, the plurality of control components comprising an electric start switch, the electric start switch operable to remove the auxiliary circuit from the stator circuit after startup of the electric motor; and lead wires electrically connecting the stator circuit and at least some of the plurality of control components, the lead wires extending through the second aperture and into the control box, the second aperture being positioned axially between the fan and the first end of the housing.

2. An electric motor according to claim 1 wherein the auxiliary circuit comprises an auxiliary winding and a capacitor, and wherein the plurality of control components further comprises the capacitor.

3. An electric motor according to claim 1 wherein the housing further comprises a first end frame positioned at the first end of the housing, a second end frame positioned at the second end of the housing, and a generally cylindrical body connecting the first and second end frames, wherein the first and second end frames each support a bearing that supports the shaft for rotation about a shaft axis, wherein the first aperture is defined in the first end frame, and wherein the second aperture is defined in the generally cylindrical body.

4. An electric motor according to claim 3 wherein the control box further comprises a contoured surface sized to substantially match an outer surface of the generally cylindrical body.

5. An electric motor according to claim 1 wherein the control box is secured to the housing using a single threaded fastener.

6. An electric motor according to claim 1 wherein the stator further comprises a second stator circuit comprising a second main circuit and a second auxiliary circuit, wherein the second stator circuit is of a permanent-split-capacitor design.

7. An electric motor according to claim 1 wherein the electric motor is an induction motor.

8. An electric motor according to claim 1 wherein the electric motor is configured for use in a jetted tub application, and where the load is a fluid pump.

9. An electric motor according to claim 1 wherein the housing defines a plurality of air vents, and wherein the air vents are positioned substantially radially outward of the fan.

10. An electric motor according to claim 9 wherein the control box is positioned at least partially between the plurality of air vents and the first end of the housing.

11. An electric motor according to claim 1 wherein the electric motor further comprises a baffle configured to substantially prevent water entering the plurality of air vents from contacting the stator, and wherein the baffle is positioned at least partially between the fan and the rotor.

12. An electric motor according to claim 1 wherein the control box comprises a plurality of power cord inlet options.

13. An electric motor according to claim 1 wherein the electric motor comprises an ambient operating specification of at least approximately 70 degrees Celsius.

14. An electric motor comprising:
a housing comprising a first end frame, a second end frame, a body connecting the first end frame and the second end frame, a shaft aperture defined in the first end frame, a lead wire aperture defined in the body, and a plurality of air vents defined in the body;

a stator fixed relative to the housing, the stator comprising a stator circuit comprising a main circuit and an auxiliary circuit, the main circuit comprising a main winding, the auxiliary circuit comprising an auxiliary winding and a capacitor;

a shaft rotatable relative to the housing and extending through the shaft aperture for connection to a load, the shaft being supported for rotation about a shaft axis by a first bearing supported by the first end frame and a second bearing supported by the second end frame;

a rotor connected to the shaft for rotation with the shaft relative to the stator;

a fan connected to the shaft for rotation with the shaft, the fan being connected to the shaft between the second end frame and the rotor, the fan being configured to pull air in a direction generally defined from the first end frame to the fan, at least a portion of the air flow generated by the fan exiting the housing through the plurality of air vents;

a control box coupled to the housing adjacent the first lead wire aperture, the control box comprising a second lead wire aperture defined in the control box, the control box being configured to house a plurality of control components utilized in the control and operation of the electric motor, the plurality of control components comprising an electric start switch, the electric start switch being operable to remove the auxiliary circuit from the stator circuit after startup of the electric motor; and lead wires electrically connecting the stator circuit and at least some of the plurality of control components, the lead wires extending through the first and second lead wire apertures, the first and second lead wire apertures being at least partially positioned axially between the fan and the first end frame.

15. An electric motor according to claim 14 wherein the control box further comprises a contoured surface sized to substantially match an outer surface of the sheet metal body.

16. An electric motor according to claim 14 wherein the control box further comprises a base portion and a cover, and wherein the cover is secure to the base portion using a single threaded fastener.

17. An electric motor according to claim 14 wherein the stator further comprises a second stator circuit comprising a second main circuit and a second auxiliary circuit, wherein the second main circuit comprises a second main winding, and wherein the second auxiliary circuit comprises a second capacitor and a second auxiliary winding.

18. An electric motor according to claim 14 wherein the lead wires do not extend axially beyond the fan in the direction of the second end frame.

19. An electric motor according to claim 14 wherein the control box comprises a plurality of power cord inlet options.

20. An electric motor comprising:
a housing comprising a first end frame, a second end frame, a generally cylindrical body connecting the first end frame and the second end frame, a shaft aperture defined in the first end frame, a lead wire aperture defined in the generally cylindrical body, and a plurality of air vents defined in the generally cylindrical body;

a stator fixed relative to the housing, the stator comprising a stator circuit comprising a main circuit and an auxiliary circuit, the main circuit comprising a main winding, and the auxiliary circuit comprising a start winding and a capacitor;

a shaft rotatable relative to the housing and extending through the shaft aperture for connection to a fluid pump of a jetted tub application, the shaft being supported for rotation about a shaft axis by a first bearing supported by the first end frame and a second bearing supported by the second end frame;

a rotor connected to the shaft for rotation with the shaft relative to the stator;

a fan connected to the shaft for rotation with the shaft, the fan being connected to the shaft between the second end frame and the rotor, the fan being configured to pull air in a direction generally defined from the first end frame to the fan, at least a portion of the air flow generated by the fan exiting the housing through the plurality of air vents;

a control box coupled to the housing adjacent the first lead wire aperture, the control box comprising a second lead wire aperture defined in the control box, the control box being configured to house a plurality of control components utilized in the control and operation of the electric motor, the plurality of control components comprising the capacitor and an electric start switch, the electric start switch being operable to remove the auxiliary circuit from the stator circuit after startup of the electric motor; and lead wires electrically connecting the stator circuit and the electric start switch, the lead wires extending through the first and second lead wire apertures, the first and second lead wire apertures being at least partially positioned axially between the fan and the first end frame, the lead wires not extending axially past the fan in the direction of the second end frame.

* * * * *